Patented Mar. 12, 1940

2,192,921

UNITED STATES PATENT OFFICE 2,192,921

PHOSPHONITRILIC CONDENSATION PRODUCT

David Lipkin, Philadelphia, Pa., assignor to The Atlantic Refining Company, Philadelphia, Pa., a corporation of Pennsylvania No Drawing. Application June 10, 1937, Serial No. 147,511

3 Claims. (Cl. 260—461)

The present invention relates to the production of organic compounds of phosphorus, and relates more particularly to the condensation of phosphonitrilic halides with organic compounds containing at least one reactive group. This application is a continuation-in-part of my application Serial Number 56,539, filed December 28, 1935.

A principal object of this invention is the production of useful condensaton products containing phosphorus and nitrogen combined with organic groups. Such products are usually viscous liquids having relatively high boiling points, stable to moisture and heat, insoluble in water, and soluble in fatty oils, mineral oil, gasoline, benzene and ether. These organic compounds of phosphorus may be suitably employed as addition agents for lubricating oils or greases, as plasticizers for resins, lacquers, varnishes and rubber, or as a fluid medium for hydraulic brakes and the like.

The reaction or condensation products which may be produced in accordance with my invention are those resulting from the condensation of the phosphonitrilic halides, and particularly the phosphonitrilic chlorides, with aliphatic, aromatic, hydroaromatic, or heterocyclic alchols, mercaptans, and halogenated hydrocarbons, or other compounds containing functions capable of reaction or condensation with the phosphonitrilic halides.

The phosphonitrilic halides, and particularly the chlorides, which I employ in my condensation reaction with various organic compounds, are shown in the following table:

| Compound | Melting point | Boiling point | |
|---|---|---|---|
| | | 13 m./m. | 760 m./m. |
| $(PNCl_2)_3$ | 114.0° C | 127° C | 256.5° C. |
| $(PNCl_2)_4$ | 123.5° C | 188° C | 328.5° C. |
| $(PNCl_2)_5$ | 41.0° C | 224° C | Polymerizes. |
| $(PNCl_2)_6$ | 90.0° C | 262° C | Do. |
| $(PNCl_2)_7$ | Below −18° C | 291° C | Do. |
| $(PNCl_2)_n$ | Below 500° C | Depolymerizes on distillation. | |

These halides are soluble in the common organic solvents and hydrocarbon oils, and may be steam-distilled, or boiled with acids or alkalis, without substantial decomposition. Upon heating to temperatures of the order of 250° C. to 350° C. each member of the series polymerizes to form high molecular weight, elastic, rubber-like compounds which are designated by the formula $(PNCl_2)_n$. At temperatures in excess of about 350° C. depolymerization of the high molecular weight compounds occurs, with the formation of the lower molecular weight halides.

Among the organic compounds which I may employ in my condensation reactions may be mentioned the hydroxy compounds such as methyl alcohol and its homologues ethyl, propyl, butyl, and amylalcohols; cresols; xylenols; naphthols; benzyl alcohol; cyclohexanol; furfuryl alcohol; hydroxy pyridine and the like. The mercaptan compounds may be represented by methyl mercaptan and its homologues ethyl, propyl, butyl, and amyl mercaptans; thiophenol; thionaphthols; benzyl mercaptan; pyridyl mercaptan; and cyclohexyl mercaptan. The halogenated hydrocarbons may be represented by methyl chloride and its homologues ethyl, propyl, butyl and amyl chlorides; chloro- or bromobenzene and their homologues; chloro-cyclohexane; and the chloronaphthalenes. Other halogenated compounds which may be suitably employed include the halogenated furanes; halogenated pyridine; halogenated quinoline; and the various halogenated alcohols, phenols, mercaptans and the like.

The condensation reactions, when employing, for example $(PNCl_2)_3$ and a hydroxy compound, or a mercaptan, respectively, may be represented by the following equations:

(1) $(PNCl_2)_3 + 6ROH \rightarrow [(RO)_2PN]_3 + 6HCl$
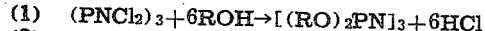
(2) $(PNCl_2)_3 + 6RSH \rightarrow [(RS)_2PN]_3 + 6HCl$
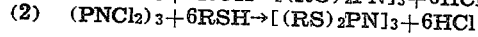

In the above reaction "R" may be either an aliphatic, hydroaromatic, aromatic or heterocyclic radical. Furthermore, the reactions may be carried on in the presence or absence of catalysts, and it is not always necessary to employ sufficient of the hydroxy, mercaptan or halogenated hydrocarbon compound to react completely with the phosphonitrilic halide, since in some instances it may be desirable to retain a certain amount of the halogen in the condensation product. Among the catalysts which may be employed may be mentioned copper oxide, copper sulfate, magnesium oxide and magnesium chloride.

In accordance with my invention, two general methods of preparation may be employed. The first is the relatively low temperature, for example, less than 150° C. and preferably about 100° C. reaction of the phosphonitrilic halide with a metallic salt of the organic compound which it is desired to condense therewith. This reaction is preferably carried out in the presence of an inert solvent or suspension medium. The second method involves the heating of the phosphonitrilic halide with the desired organic compound in a vessel provided with a reflux condenser. The latter method is particularly applicable to the condensation of the phosphonitrilic halide with phenols or thiophenols, since it is characteristic of them that the side reactions which may occur with the alcohols or mercaptans do not take place to an appreciable extent. Thus, higher temperatures may be employed which permit a faster reaction rate. In the case of the alcohols and aliphatic mercaptans, it is desirable to operate at a lower temperature, and, in order to increase the rate of reaction, the alcohol or mercaptan is first caused to combine with a metal, for example, sodium or potassium, to produce an alcoholate or mercaptide which is considerably more reactive than the alcohol or mercaptan from which it is derived. In either of the aforementioned procedures, it may be desirable to carry out the condensation reaction under superatmospheric pressure, for example, of the order of 100 lbs./sq. in., or greater, in order to accelerate the rate of reaction. The condensation of mercaptans or thiophenols with the phosphonitrilic halide is preferably effected in an inert atmosphere to prevent excessive oxidation of the reactants. Methane, nitrogen, or other inert gas may be employed for this purpose.

Typical examples of my products and methods of preparing the same are as follows:

*Example 1*

10 parts by weight of phosphonitrilic chloride, comprising substantially $(PNCl_2)_3$ and $(PNCl_2)_4$, was admixed with 16.2 parts by weight of phenol dissolved in a slight excess of 15% sodium hydroxide solution, and the mixture was refluxed at about 110° C. for about 40 hours. The mixture, after refluxing, was cooled and the aqueous caustic solution was separated from the reaction product, which was thereafter water washed. The washed product was then dissolved in ether, the solution dried over anhydrous $CaCl_2$, and then distilled under reduced pressure to remove the ether and unreacted phenol. The distillation residue, consisting principally of the polymers of diphenyl metaphosphimate $[(C_6H_5O)_2PN]_n$, wherein "$n$" may be from 3 to 7, was a viscous liquid, insoluble in water and soluble in petroleum naphtha, benzene and ether.

*Example 2*

7.6 parts by weight of phosphonitrilic chloride, comprising substantially $(PNCl_2)_3$ and $(PNCl_2)_4$, was admixed with 16.1 parts by weight of ortho-cresol, and the mixture was refluxed at a temperature of from 186° C. to 309° C., in the presence of a small quantity of MgO and metallic copper, for a period of about 97 hours. The reaction product was then steam-distilled to remove therefrom any reacted cresol and the distillation residue was warmed with aqueous alkali solution to remove any acidic material. The acid-free product was then water-washed, taken up in ether and dried over anhydrous $Na_2SO_4$. The ether was thereafter removed by vaporization and there was obtained a liquid condensation product, i. e., the polymers of di-ortho-cresyl metaphosphimate, having properties generally similar to those of the product of Example 1.

*Example 3*

7.1 parts by weight of phosphonitrilic chloride, comprising substantially $(PNCl_2)_3$ and $(PNCl_2)_4$, was admixed with 14.8 parts by weight of ortho-cresol dissolved in a slight excess of 15% sodium hydroxide solution, and the mixture was refluxed at about 110° C. for about 9 hours. After completion of the refluxing, the reaction product was acidified with HCl and then steam-distilled to remove any unreacted ortho-cresol. The distillation residue was dissolved in ether, the ether solution filtered, and the filtrate dried over anhydrous $Na_2SO_4$. Upon removal of the ether from the solution there was obtained a viscous or syrupy liquid consisting essentially of the polymers of di-ortho-cresyl metaphosphimate.

*Example 4*

3.9 parts by weight of metallic potassium was dissolved in an excess of anhydrous n-butyl alcohol and 5.8 parts by weight of phosphonitrilic chloride, comprising substantially $(PNCl_2)_3$ and $(PNCl_2)_4$ in anhydrous butyl alcohol, was added thereto and the mixture refluxed at about 100° C. to about 117° C. for about 13 hours. After refluxing, the reaction mixture was filtered, and the filtrate subjected to distillation under reduced pressure to remove the excess n-butyl alcohol. The distillation residue, consisting principally of the polymers of dibutyl metaphosphimate $[(C_4H_9O)_2PN]_n$, was a viscous liquid, insoluble in water and soluble in gasoline, lubricating oil, benzene and ether.

*Example 5*

3.9 parts by weight of metallic potassium was added to a solution of 13.5 parts by weight of n-butyl mercaptan dissolved in anhydrous tertiary butyl alcohol. To this solution was added 5.8 parts by weight of phosphonitrilic chloride, comprising substantially $(PNCl_2)_3$ and $(PNCl_2)_4$, in solution in tertiary butyl alcohol. This mixture was refluxed, in an atmosphere of nitrogen, at a temperature of about 85° C. for about 13 hours. After refluxing was completed, the reaction mixture was filtered and the filtrate was distilled under reduced pressure to remove the tertiary butyl alcohol, any unreacted butyl mercaptan, and any butyl disulfide which may have been formed. There was obtained as a distillation residue, a thick, oily liquid consisting principally of the polymers of dibutyl thiometaphosphimate $[(C_4H_9S)_2PN]_n$.

*Example 6*

11.6 parts by weight of phosphonitrilic chloride, comprising substantially $(PNCl_2)_3$ and $(PNCl_2)_4$, was dissolved in ether and this solution was added, with stirring, to 59.1 parts by weight of butyl magnesium iodide $(C_4H_9MgI)$ in ether solution. This mixture was refluxed on a water-bath for about 4 hours and then poured into ice water to decompose the excess butyl magnesium iodide. The water-ether mixture was then filtered to remove $Mg(OH)_2$, the filtrate was saturated with sodium chloride, and the ether solution was separated from the aqueous solution. The ether solution of the condensation product was dried over anhydrous $CaSO_4$, and the dried solution was distilled to remove the ether. The distillation residue, consisting principally of the polymers of dibutyl phosphine nitride $[(C_4H_9)_2PN]_n$, was a syrupy liquid, insoluble in water and soluble in petroleum naphtha, benzene and ether.

It will be seen from the above examples, that there may be produced viscous, oily products by the condensation of a phosphonitrilic halide with an organic compound containing at least one reactive group, for example, alcohols, phenols, mercaptans and the like. Any organic compound containing an active group or replaceable hydrogen atom may be employed in my condensation reaction. The condensation products are usually viscous or syrupy liquids having high boiling points, i. e., above 100° C. at 5 m./m. pressure (absolute).

In the formulae for the condensation products of the above examples, subscript "$n$" usually ranges from 3 to 7, depending upon the phosphonitrilic halide employed and the temperature required to effect the desired reaction. When the phosphonitrilic halide comprises essentially $(PNCl_2)_3$ or $(PNCl_2)_4$, and the reaction temperatures are relatively low, the subscript "$n$" of the resulting condensation product will, in general, have a value of 3 or 4. However, when higher reaction temperatures are required, the condensation products will contain higher polymers and the subscript "$n$" may have a value up to 7 and even higher. While I have described my invention primarily with respect to the use of the phosphonitrilic chlorides as one component in my condensation reaction, I may employ in lieu thereof, the phosphonitrilic bromides, iodides and fluorides.

What I claim is:

1. In a process for producing a condensation product of a phosphonitrilic chloride with an organic compound containing a substituent from the group consisting of —OH and —SH, the steps which comprise replacing the active hydrogen atom of such substituent with an alkali metal, admixing the resultant alkali metal salt with phosphonitrilic chloride, heating said admixture of salt and phosphonitrilic chloride to a temperature sufficient to effect reaction therebetween, and separating from the reaction mixture the condensation product so produced.

2. A condensation product of a phosphonitrilic chloride with a mercaptan.

3. A condensation product of a phosphonitrilic chloride with butyl mercaptan.

DAVID LIPKIN.